(12) United States Patent
Tiirola et al.

(10) Patent No.: US 9,831,927 B2
(45) Date of Patent: *Nov. 28, 2017

(54) METHOD OF SCHEDULING TRANSMISSIONS IN A COMMUNICATION SYSTEM

(71) Applicant: Nokia Solutions and Networks Oy, Espoo (FI)

(72) Inventors: Esa T. Tiirola, Kempele (FI); Kari P. Pajukoski, Oulu (FI); Kari J. Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 69 days.

This patent is subject to a terminal disclaimer.

(21) Appl. No.: 14/715,911

(22) Filed: May 19, 2015

(65) Prior Publication Data

US 2015/0256236 A1 Sep. 10, 2015

Related U.S. Application Data

(63) Continuation of application No. 13/266,617, filed as application No. PCT/EP2009/055077 on Apr. 27, 2009, now Pat. No. 9,017,412.

(51) Int. Cl.
| | |
|---|---|
| H04B 7/04 | (2017.01) |
| H04B 7/0404 | (2017.01) |
| H04W 24/00 | (2009.01) |
| H04W 72/12 | (2009.01) |
| H04L 5/00 | (2006.01) |

(Continued)

(52) U.S. Cl.
CPC ......... *H04B 7/0404* (2013.01); *H04B 7/0408* (2013.01); *H04B 7/0456* (2013.01); *H04L 5/0091* (2013.01); *H04L 25/03343* (2013.01); *H04W 24/00* (2013.01); *H04W 72/0413* (2013.01); *H04W 72/12* (2013.01);

(Continued)

(58) Field of Classification Search
CPC .. H04B 7/0404; H04B 7/0408; H04B 7/0456; H04L 5/0091; H04L 25/03343; H04L 2025/03414; H04L 2025/03426; H04W 24/00; H04W 72/0413; H04W 72/12; H04W 72/14; H04W 88/08

See application file for complete search history.

(56) References Cited

U.S. PATENT DOCUMENTS

| | | |
|---|---|---|
| 2006/0262856 A1 | 11/2006 | Wu et al. |
| 2008/0132282 A1 | 6/2008 | Liu et al. |

(Continued)

OTHER PUBLICATIONS

R1-071044, "Precoding Considerations in LTE Mimo Downlink", Ericsson, TSG-RAN WG1 #48, St. Louis, Usa, Feb. 12-16, 2007, 11 pgs.

(Continued)

*Primary Examiner* — Habte Mered
(74) *Attorney, Agent, or Firm* — Harrington & Smith

(57) ABSTRACT

In a telecommunication system, a method of controlling and implementing uplink transmission schemes specifically for user equipment having multiple input/multiple output (MIMO) capability, comprising: initializing said scheme at a network element; forwarding a message from said network element to said terminal indicating said scheme; transmitting uplink signals according to said scheme. It may comprises selecting a pre-coding arrangement such as a Transmitted Precoding Matrix Indicator or other scheduling grant information.

26 Claims, 2 Drawing Sheets

(51) Int. Cl.

| | | |
|---|---|---|
| *H04L 25/03* | (2006.01) | |
| *H04B 7/0408* | (2017.01) | |
| *H04B 7/0456* | (2017.01) | |
| *H04W 72/04* | (2009.01) | |
| *H04W 72/14* | (2009.01) | |
| *H04W 88/08* | (2009.01) | |

(52) U.S. Cl.
CPC ... *H04W 72/14* (2013.01); *H04L 2025/03414* (2013.01); *H04L 2025/03426* (2013.01); *H04W 88/08* (2013.01)

(56) References Cited

U.S. PATENT DOCUMENTS

| | | |
|---|---|---|
| 2011/0064156 A1 | 3/2011 | Kim et al. |
| 2011/0199975 A1 | 8/2011 | Wu |
| 2012/0014349 A1 | 1/2012 | Chung et al. |

OTHER PUBLICATIONS

R1-091520, "Analysis of Feedback Signalling for Downlink CoMP", CATT, 3GPP TSG RAN WG1 meeting #56bis, Korea, Mar. 23-27, 2009, 3 pgs.

R1-0891597 (R1-091368), "Performance Comparison between Tx Diversity and Single Stream Preceding", Nokia Siemens Networks, Nokia, 3GPP TSG RAN WG1 Meeting #56bis, Seoul, Korea, Mar. 23-27, 2009, 7 pgs.

METHOD OF SCHEDULING TRANSMISSIONS IN A COMMUNICATION SYSTEM

CROSS-REFERENCE TO RELATED APPLICATIONS

This application is a continuation of U.S. patent application Ser. No. 13/266,617, which is the National Stage of International Application No. PCT/EP2009/055077, filed Apr. 27, 2009.

This invention relates to communications systems and has particular focus to scheduling and control of transmissions between base stations and user equipment in cellular communications systems. The invention has particular application to control and scheduling of uplink transmissions in single user Multiple Input Multiple Output (MIMO) systems. Such systems may include the use of user equipment with multiple transmit antennae to increase data transmission rates, data coverage and system capacity.

More specifically the invention is concerned also with pre-coding) arrangements for single user MIMO (SU-MIMO) systems. These are for incorporation into Long Term Evolution (LTE) advanced cellular communication systems which will form part of the Third Generation Partnership Project (3GPP) LTE Rel. 10. Precoding is generalized beam-forming to support multi-layer transmission in MIMO radio systems. Conventional beam-forming considers linear single-layer precoding so that the same signal is emitted from each of the transmit antennas with appropriate weighting such that the signal power is maximized at the receiver output.

It has been decided that SU-MIMO UL transmissions (FDD) will involve transmission precoding techniques and this precoding utilizes fixed codebooks.

A communication system is a facility which facilitates the communication between two or more entities such as communication devices, network entities and other nodes. A communication system may be provided by one more interconnected networks. A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

In cellular systems a network entity in the form of a base station provides a node for communication with mobile devices in one or more cells. A base station is often referred to as a 'Node B'. There are many different techniques for processing signals for transmission between the base station and the user equipment. Typically the operation of a base station apparatus and other apparatus of an access system required for the communication is controlled by a particular control entity. The control entity is typically interconnected with other control entities of the particular communication network.

A non-limiting example of a type of access architecture is a concept known as the Evolved Universal Terrestrial Radio Access (E-UTRA), which is part of the Third Generation Partnership Project Long Term Evolution (3GPP LTE) standard LTE-Advanced is an evolution of LTE Rel'8 system fulfilling the ITU-R requirements for IMT-Advanced. Future LTE-Advanced systems are proposed which will use a SU-MIMO with 2-4 transmission antennas for the user equipment (UE). In relation to uplink SU-MIMO precoding in LTE-Advanced systems it is suggested to use codebook-based short-term precoding (based on instantaneous channel knowledge) at least with Frequency Division Duplex mode of LTE-Advanced. It is feasible only for low and moderate UE speeds and applicable to dynamically scheduled PUSCH only.

It is also proposed to use a single TPMI (Transmitted Precoding Matrix Indicator) per UL component carrier.

Various open-loop (OL) transmit diversity schemes have been suggested for methods of transmitting data for both the Physical Uplink Shared Channel (PUSCH) and Physical Uplink Control Channel (PUCCH). Open-loop Systems do not have or utilize a dynamic feedback channel, that is to say no channel knowledge at the TX side, to signal the instantaneous channel from receiver to transmitter. In this particular context, eNB does not use (downlink) feedback channel to dynamically signal MIMO transmission related parameters such as TPMI or RI (rank indicator) from eNB to UE.

In contrast closed-loop techniques measure and signal the instantaneous channel from receiver to transmitter. Transmitter utilizes signalled channel at the transmitter side. In this particular context, eNB uses feedback channel to dynamically signal MIMO transmission related parameters such as TPMI or RI (rank indicator) to the transmitter. The transmitter adjusts its transmission according to the received parameters.

Concerning open-loop coding schemes, several different types are known each having advantages and disadvantages. These include Space Time Block Coding (STBC), Frequency Selection Transmit Diversity (FSTF), Cyclic Delay Diversity (CDD), and various combinations of such schemes. However none of the schemes provides a sufficient single solution for MIMO systems. User equipment with for example, two or four transmission outputs, require their own open-loop scheme which results in additional complexity. Handling of the orphan symbol problem requires special method with STBC, which although a popular open-loop TX diversity scheme incurs additional complexity. Further more different open-loop solutions for both PUSCH and PUCCH will result in additional complexity. Studies have shown that open-loop schemes do not contribute in performance results of 3GPP (LTE-Advanced SI) and ITU-R evaluations. STBC suffers from high Doppler and coverage loss with respect to Rel.8 scheme. FSTD suffers from transmission (TX) antenna unbalance and CDD suffers from degraded performance with SC-FDMA. It has been suggested that open-loop schemes (with TX diversity/OL spatial multiplexing) are needed with SU-MIMO in the case when instantaneous channel state is either unavailable or out-to-date. These cases include e.g., high mobility (instantaneous Channel State Information is out-to-date) and persistent scheduling (CSI is not available). Additionally, the feedback channel for signaling the instantaneous TPMI is unavailable in some cases (e.g., with PUCCH).

There exists a problem of how to arrange uplink transmission (diversity) schemes with SU-MIMO LTE-Advanced systems with only limited channel state information and very low feedback rate are available. It is preferable that power amplifiers (PA) in a SU-MIMO user equipment (there is usually one for each transmit antenna) are dimensioned for multi-antenna transmission. This leads to smaller and balanced (in terms of Tx power) PAs. Transmission arrangements should therefore optimise the use of all transmission power resources available at the UE in order to maintain the UL coverage. Transmission arrangements should mitigate the impact of possible negative correlation between transmit antennas and should tolerate inbalance between TX antennas that may arise due to the grip of the hand when holding the user equipment and change of antenna orientation; these effect different responses to the vertical and horizontal polarization components. Excessive complexity should be avoided in SU-MIMO system design, and performance should be sufficient in different environments.

It is known to exploit spatial radio channel characteristics in the adjustment, modification, or configuration of transmitted signals. Covariance matrix describes the correlation properties between the transmit antennas. Power imbalance is another factor which relates to spatial radio characteristic (it is actually visible at the diagonal of the covariance matrix). Correlation properties depend on the antenna configuration i.e., characteristics of TX antenna array/radiator elements (e.g., polarized antennas vs. dipole antennas), inter-element spacing between the antennas, radio channel characteristics (angular spread, direction of arrival) etc.

Such characteristics may be long term characteristics. One such example is the use of Direction of Arrival (DoA) based beam-forming (e.g. in a FDD system) where a base station (eNB) measures the DoA from the uplink signal, and consequently the eNB forms the downlink beam towards the measured DoA. The eNB tracks the DoA from the available uplink signal and adjusts the downlink transmit beam accordingly.

Thus it is an aim of the herein described embodiments to provide a method of scheduling and control of uplink transmissions in (PUCCH and/or PUSCH) in MIMO systems without the aforementioned disadvantages of open-loop schemes. The invention is not limited to MIMO systems but also applicable to any systems with multiple transmit capability even if only one receive (RX) antenna is supported.

This invention is applicable to closed-loop cases in the sense such that there is a feedback link available as there is a need signal the initial TPMI. Furthermore, there is a need to have means to update the TPMI e.g., periodically or on the need basis. The requirement for the feedback rate is very low, compared to existing closed-loop precoding exploiting instantaneous channel.

In accordance with an embodiment there is provided, in a telecommunication system, a method of controlling and implementing transmission schemes between a first network element and a second network element, said second network element having multiple transmit antenna capability comprising the steps of: measuring at least one parameter and or characteristic of a radio channel between the second network element and the first network element; based on this initialising and/or selecting a scheme at said first network element; forwarding a control message from said first network element to said second network element indicating said scheme; storing data pertaining to the scheme by said second network element; transmitting signals between the network elements according to said scheme, wherein said measuring, initialising, forwarding and/or storing is not performed continuously and pre-existing scheduling grants or precoding information defined for short-term pre-coding are used.

The selection step may select a precoding arrangement or a precoding matrix or a precoding vector. In the forwarding step, a scheduling grant information containing information about Transmitted Precoding Matrix Indicator may be forwarded. In another embodiment this may be a scheduling grant information containing no information about Transmitted Precoding Matrix Indicator. It may comprise forwarding information of selected precoding mode.

The first network element may be a base station or evolved Node B, and said second network element may be a user equipment. It may relate to uplink communication. The scheme may be updated with an updated message.

Preferably the scheme is selected or updated dependent on higher level signalling.

The precoding may be selected from a set of precoding modes. It may also be selected specifically for each channel.

The scheme or precoding may be that pertaining to the Physical Uplink Shared Channel (PUSCH) and/or the Physical Uplink Control Channel (PUCCH).

There is also provided a system arranged to control and implement transmission schemes between a first network element and a second network element, said second network element having multiple transmit capability, comprising: means to measuring at least one parameter or characteristics of a radio channel between the network elements; means to initialise and/or select said scheme at said first network element, based on indications from said measuring means; means to forward a control message from said first network element to said second network element indicating said scheme; means to store in said second network element data pertaining to the scheme; means to transmit signals between the network elements according to said scheme wherein the scheme is left unchanged for a plurality of adjacent transmitted signals, and wherein said measuring, initialising, forwarding or storing means are adapted such that measuring, initialising, forwarding and/or storing is not performed continuously, and having means to use pre-existing scheduling grants or precoding information defined for short-term pre-coding.

The initialising means preferably comprises means to select a pre-coding arrangement. The forwarding means may comprise means to forwarding a Transmitted Precoding Matrix Indicator or other scheduling grant information, e.g. means to forward scheduling grant information containing no information about Transmitted Precoding Matrix Indicator.

The scheme may be selected or updated dependent on higher level signalling.

The precoding may be selected from a set of precoding modes or selected specifically for each channel.

There is also provided a network element having multiple transmit capability, comprising: means to receive messages non-continuously, containing information indicating a scheme to control and schedule transmissions between it and other network elements; means to store said information: means to transmitting signals between it and other network elements according to said scheme, and, having means to use pre-existing scheduling grants or precoding information defined for short-term pre-coding.

There is also provided a network element arranged to control and implement transmission schemes between a it and a second network element, said second network element having multiple transmit capability, comprising: means to measure at least one parameter or characteristics of a radio channel between the network elements; means to initialise and/or select said scheme at said first network element, based on indications from said measuring means; means to forward a message from said first network element to said second network element indicating said scheme; means to receive or transmit signals to or from said second network element according to said scheme, wherein said means to measure, select and/or forward are arranged to perform these operations non-continuously, and having means to use pre-existing scheduling grants or precoding information defined for short-term pre-coding.

For a better understanding of the present embodiments and how these may be carried into effect, reference will now be made by way of example only to the accompanying drawings in which:

FIG. 3 shows a schematic representation of network elements and the signalling there-between.

Figure 1:
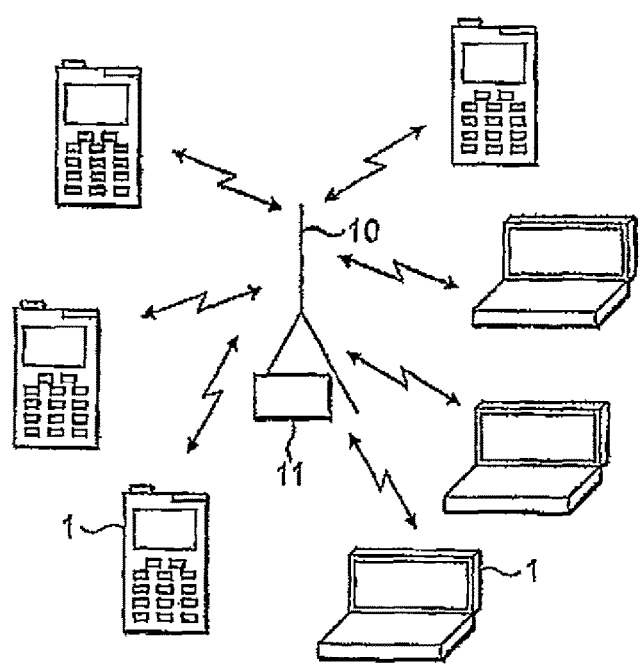
FIG. 1 shows a schematic presentation of a communication system wherein the invention may be embodied.

Before explaining in detail a few exemplifying embodiments, a brief explanation of wireless access is given with reference to FIG. 1 showing a communication system providing wireless communications to a plurality of communication devices 1. A communication device 1, for example a mobile user device, or equipment or a relay node, can be used for accessing various services and/or applications provided via the wireless communication system. A communication device can typically access wirelessly a communication system via at least one wireless transmitter and/or receiver node 10 of an access system. Non-limiting examples of access nodes are a base station of a cellular system, for example a 3G WCDMA Node B, an enhanced Node B (eNB) or relay node of 3GPP LTE (long term evolution), a base station of a wireless local area network (WLAN) and a satellite station of a satellite based communication system. The communication devices 1 may also communicate directly with each other.

The communications may be arranged in various manners based on an appropriate radio access technology or technologies. The access is provided via radio channels also known as access channels. Each communication device 1 may have one or more radio channels open at the same time. Each communication device may be connected to more than one base station 10 or similar entity. Also, a plurality of communicate devices may communicate with a base station or similar, and/or attempt to access the communication system via the same base station. A plurality of communication devices may also share a channel. For example, to start communications or to connect to a new access system, a plurality of communications devices may attempt to make the initial contact via a single channel, for example via a random access channel (RACH). The attempts to access may be made substantially at the same time.

The base station 10 of the access system can be connected to other parts of the communication system via appropriate connections, for one or more appropriate gateway nodes. These are not shown for clarity. A base station is typically controlled by at least one appropriate controller apparatus (this is true for GSM and WCDMA. However in LTE and WiMAX there is no controller anymore, but control functionality is distributed to appropriate network elements such as general access nodes, base stations, nodeB's, eNBs, AP's) generally denoted by 11 in FIG. 1. The controller apparatus 11 can be provided for managing of the operation of the base station and/or communications via the base station. The controller apparatus is typically provided with memory capacity and at least one data processor. Various functional entities may be provided in the controller by means of the data processing capability thereof. The functional entities provided in the base station controller may provide functions relating to radio resource control, access control, packet data context control, relay control and so forth.

Network elements, such as base stations 10 are managed by using network management operations support system (OSS). OSS's role is to supporting processes such as maintaining network inventory, provisioning services, configuring network components, and managing faults. OSS architecture is based on four layers: Business Management Level (BML), Service Management Level (SML), Network Management Level (NML), Element Management Level (EML). Network elements can be managed from network management system (NMS) or element management system (EMS). Base stations 10 are connected to NMS over open Itf-N (so called northbound interface) or to EMS over proprietary Itf-S interface (southbound interface).

A communication device 1 can be used for various tasks such as making and receiving phone calls, for receiving and sending data from and to a data network and for experiencing, for example, multimedia or other content. For example, a communication device may access applications provided via a telephone network and/or a data network, such as applications that are provided based on the Internet Protocol (IP) or any other appropriate protocol. An appropriate mobile communication device may be provided by any device capable of at least sending and/or receiving wireless signals from the access system. Non-limiting examples include a mobile station (MS) such as a mobile phone or a smart phone, a portable computer provided with a wireless interface card or other wireless interface facility, personal data assistant (PDA) provided with wireless communication capabilities, or any combinations of these or the like.

Figure 2:
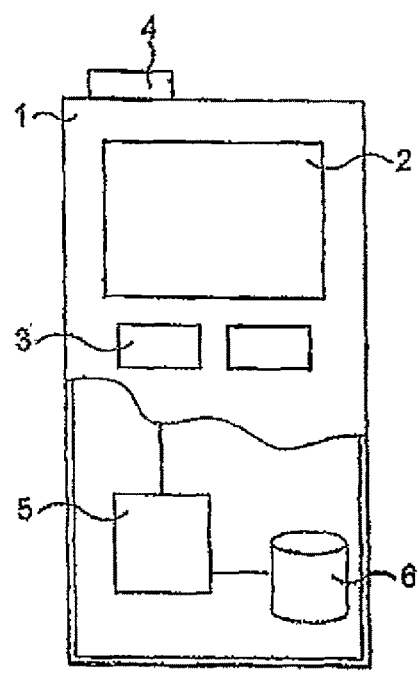
FIG. 2 shows a sectioned view of communication user equipment.

As shown in FIG. 2, a communication device 1 is typically provided with appropriate data processing apparatus, such as at least one data processor 5. At least one memory device 6 is also typically provided. The data processing and storage entities can be provided on an appropriate circuit board and/or in chipsets. Different functions and operations may be provided by different chips. Alternatively, at least partially integrated chips may be used. Antenna means 4, a display 2, and/or a keypad 3 may also be provided.

As mentioned, the invention provides an arrangement to implement the control of uplink communication in MIMO systems.

The example provides for a long-term precoding arrangement for SU-MIMO in LTE-Advanced. "Long-term" means that fast fading is (at least partially) averaged out when defining the TPMI. Information regarding the multi-antenna transmission scheme to be used e.g. transmission rank and TPMI, is signalled/updated just every now and then. In long term precoding slow changes on the averaged spatial radio channel characteristics are tracked on the need basis. Proper reference signal configuration (e.g., based on sounding reference signal) enabling channel tracking is arranged by the eNB. The term "short term" is to be interpreted as such hereinafter. In short-term precoding, eNB continuously tracks the instantaneous channel (in time) and updates TPMI accordingly. Short-term precoding can be made in frequency selective or in wideband manner. In frequency selective approach, different TPMI can be applied for different frequency portions of the transmitted signal whereas in wideband precoding, the same TPMI is applied for the whole bandwidth.

The main difference between short-term precoding (from precoding arrangement point of view) is that with long-term precoding UE has capability to store the TPMI in its memory. UE will just apply the most recent TPMI available. In short-term precoding there is no such an alternative;

TPMI must be signalled for each PUSCH transmission separately. Preferably the invention uses existing codebook design specified for closed-loop SU-MIMO designed for short-term precoding. The invention is applicable at least to the following uplink channels: PUCCH, dynamically scheduled PUSCH, persistent/semi-persistent PUSCH, periodic PUSCH.

One simple embodiment comprises the following basic steps. Firstly the long-term TPMI (Transmitted Precoding Matrix Indicator) to be utilized is selected by the eNB. This is preferably based on the available reference signals, e.g., sounding reference signal. "Long-term" averaging or estimation may be applied when measuring the long-term statistics of the radio channel. Radio channel between UE and eNB has certain long-term properties based on tx/rx antenna arrangement and radio environment (azimuth spread, angle of arrival, antenna patterns, shadow fading etc.).

On top of long-term properties there are short-term properties often referred as fast fading. Fast-fading is caused by the multipath-propagation. Fast fading has certain properties regarding to time and frequency correlation (depending on the Doppler and multipath spread).

Reference signals are used to measure the radio channel. Averaging of received reference signal or estimated radio channel in time/frequency can exceed the channel coherence in frequency/time (fast fading is averaged out).

The entity controlling the long-term precoding may be located at an eNB (or in some other network element). The controlling may include performing the channel measurement and deciding the TPMI, for example. In uplink case, precoding is performed at the UE side, the UE is initialized/updated with SU-MIMO scheduling grant (or dedicated higher layer signalling) containing TPMI. Thus, long-term TPMI is forwarded to the UE; the UE stores the received TPMI in its memory. The UE applies the last received TPMI when scheduling uplink i.e. for pre-determined channels (PUCCH/PUSCH).

In an embodiment the reliability of precoder initialization/update can be increased by means of repeating the initialization/update multiple times. In another embodiment a pre-defined number of initialisations/updates for TPMI is needed in order to make the initialisation/update effective.

In another embodiment, long-term precoding may be performed using a scheduling grant having no information about the TPMI. The UE applies the last received TPMI. Thus, scheduling grant used typically for non-MIMO UEs can be used during long-term precoding.

In another embodiment TPMI may be stored in layer specific manner. The UE stores the received TPMI for each transmission rank in its memory. For example long-term precoding may be applied on the PUCCH (layer-1) in parallel with long-term precoded spatial multiplexing on the PUSCH.

A fully dynamic switching between short-term and long-term closed-loop precoding modes may thus be provided (e.g., in the case when the UE speed increases such that short-term precoding is not feasible any more). The same applies to spatial multiplexing.

The usage of long-term precoding may be switched on/off via higher layer signaling. The signalling may also limit the usage of long-term precoding to a configurable set of channels. UE-specific higher-layer signaling can be used for this purpose (use of other signaling means is not precluded). In another embodiment usage of long-term precoding may be limited to pre-determined channel(s), e.g., PUSCH.

In another embodiment, the used precoding mode is selected from a set of pre-determined precoding modes via higher layer signaling. UE-specific higher-layer signaling can be used for this purpose (use of other signaling means is not precluded). The precoding mode set may include short-term precoding, long-term precoding and a pre-determined fixed precoding mode. The precoding mode selection may also be specific for each channel. In another embodiment the used precoding mode is pre-determined at least for one of the channel(s), e.g., PUCCH.

In an embodiment of fixed precoding mode, UE uses precoding vectors (or matrices) specific for each slot, e.g., two precoding vectors in the case of LTE-Advanced having two slots in a subframe. The example of known 6-state precoding vectors for 2 transmitter antennas are described below, (first line is for antenna 1 and second line for antenna 2).

$$v = \begin{bmatrix} \frac{1}{\sqrt{2}} & \frac{1}{\sqrt{2}} & \frac{1}{\sqrt{2}} & \frac{1}{\sqrt{2}} & 1 & 0 \\ \frac{1}{\sqrt{2}} & \frac{-1}{\sqrt{2}} & \frac{j}{\sqrt{2}} & \frac{-j}{\sqrt{2}} & 0 & 1 \end{bmatrix}$$

Precoding elements may be predetermined so that the diversity is maximized. For example, the first column is predetermined for slot 1 and second column is predetermined for slot 2 (or vice versa). The second embodiment is that the third column is predetermined for slot 1 and the fourth column is predetermined for slot 2 (or vice versa). The third embodiment is that the second antenna is rotated 180 degrees in the second slot only. And the first antenna is not precoded (neither in the first nor the second slot).

In yet another embodiment, long-term precoding is applied only to layer-1 (single codeword) transmission. In this case, the existing Rel'8 type of DCI (Downlink Control Information) Format 0 supporting only single layer could be used with long-term precoding.

In the case when long-term precoding is applied to spatial multiplexing (multiple codewords), it may be limited to a predetermined mode using HARQ-ACK spatial bundling and layer shifting between the code-words; this allows usage of compact size DCI format(s) with long-term pre-coding.

Figure 3:
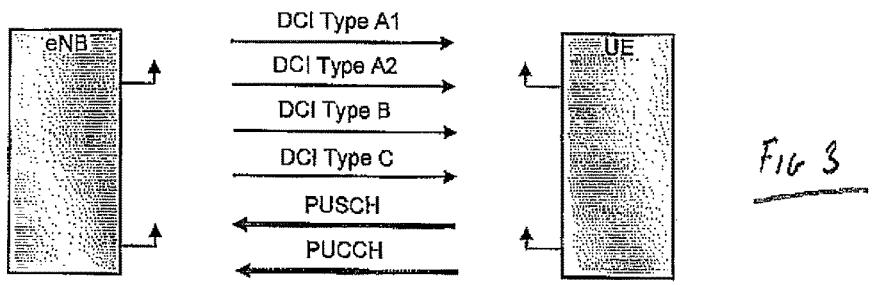

FIG. 3 shows a schematic representation of a system according to an embodiment of the invention comprising of an eNB 1, and a SU-MIMO capable user equipment 2. Uplink transmission between these two elements may be on PUSCH and/or PUCCH.

Various signals are exchanged between the network elements so as to implement the coding scheme for uplink transmission. Downlink Control Information (DCI) is sent from the eNB to the UE. DCI may take the form of various formats. DCI Type A1, which is conventionally used for the scheduling pre-coded PUSCH, contains information about the TPMI selected. DCI Type A2 may also be sent which is conventionally used for the scheduling non-precoded PUSCH containing no information about TPMI.

Additional DCI formats may also be used; these include DCI Type B (downlink grant) used for scheduling PDSCH. DCI Type C (dynamic control grant) used for the transmission of at least TPMI commands.

Figure 4:
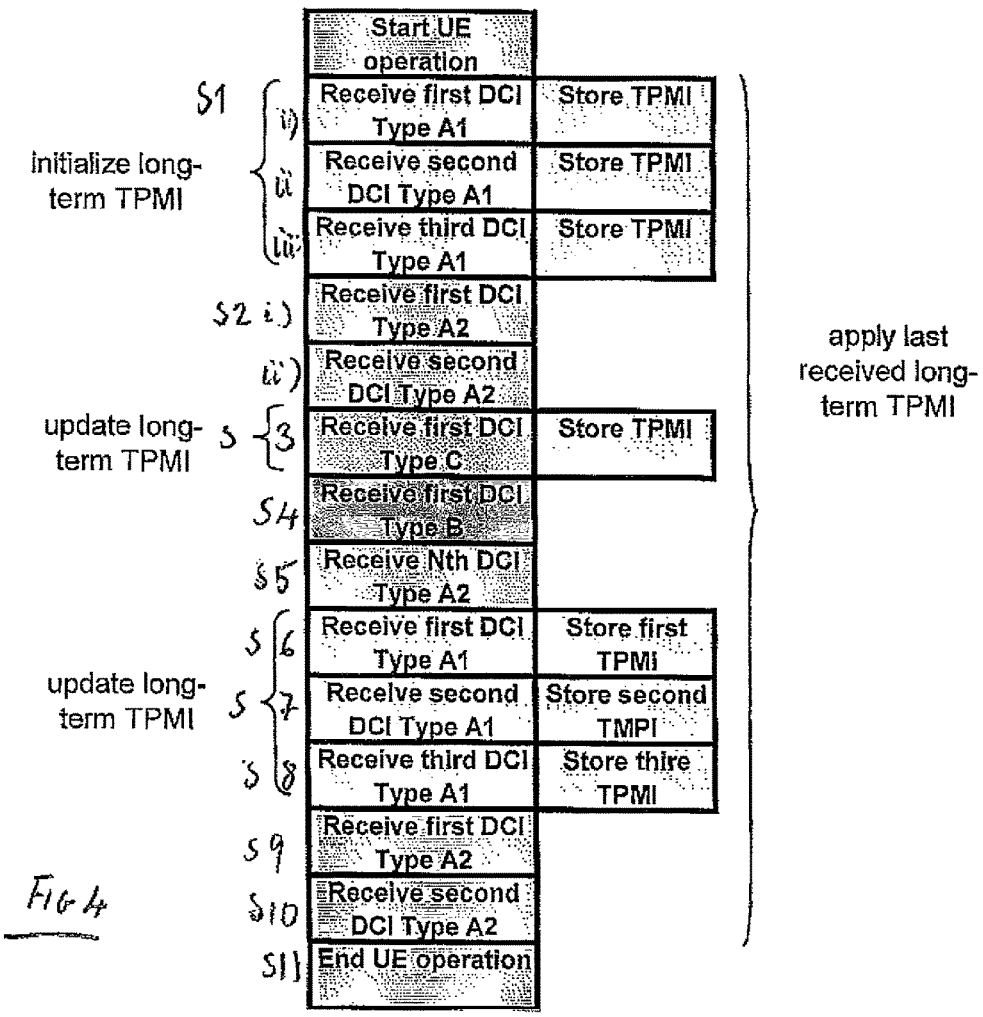
FIG. 4 shows a table showing examples of the procedure to implement certain embodiment of the invention.

FIG. 4 shows in more detail the operation according to various embodiments of the invention illustrating how the various types of Downlink Control Information (DCI) are received and stored by the User Equipment from the Node B in order to provide long-term precoding to dynamically scheduled PUSCH and PUCCH.

S1(i) shows where an eNB transmits to a user equipment a first DCI Type A1 which contains information about the TMPI to be applied on the PUSCH. The user equipment stores the TPMI information. This TMPI information is then subsequently used to control precoding operation for scheduled uplink transmission e.g. the PUSCH subject to DCI Type A1.

S1(ii) shows that the UE may receive additionally a further second signal DCI Type A1 from the eNB. This provides the UE with new TPMI information which it then stores and which is used instead to control uplink transmissions on the PUSCH. The advantage of this is that it is always possible that DCI fails in the downlink which would cause an error case where the UE has no valid long-term TPMI available. The eNB can thus decrease the probability of this error case by sending DCI Type A1 containing an information about (the same) TPMI multiple times to the UE and may receive a third DCI type A1 (as shown in S1(iii)) or even further A1 DCI's. It is also possible to define that a pre-defined number of initialization/update for TPMI is needed in order to make the initialization/update effective.

S2 (i) shows the example where a UE receives DCI Type A2, which contains no information about TPMI. In this instance, it transmits subsequently on PUSCH and or PUCCH using TPMI received in the received DCI Type A1. It may receive further DCI Type A2's where the procedure is the same, S2(ii).

S3 shows an alternative where the UE receives a (first) DCI of Type C. The TMPI information received in this DCI message is stored along with any other control information contained therein. This signalling type of DCI can be used in updating/initializing the long-term TPMI e.g., in the case of persistent scheduling where dynamic PUSCH (DCI Type A1) is not allocated.

S4 shows that additionally (the UE receives the first DCI Type B. This takes place in the case when UE has been configure to apply long-term precoding also on PUCCH (another choice would be to apply pre-defined transmit diversity scheme on the PUCCH instead of long-term precoding).

According to this type of DCI message, in the subsequent operation uplink, the UE can transmit corresponding ACK/NACK signals on the PUCCH based on last available TPMI in the case the UE has been configured to apply long-term pre-coding on PUCCH.

S5 to S11 show further DCI messages of each type may be received whereby the TMPI information therein (with the exception of Type A2) is stored so that the method of subsequent uplink transmission on PUCCH and PUSCH is updated.

In the case when UE receives DCI Type A1, this is considered as an update for the long-term TMPI.

The benefit of this arrangement compared to PUCCH Open Loop diversity schemes is that the SU-MIMO UE can cope with the existing PUCCH resources and there is no need to double the occupied PUCCH Format 1a/1b resources due to SU-MIMO).

In further embodiments, dedicated higher layer (RRC) signalling can be applied in parallel with or instead of the dynamic DCI signalling. Such embodiments may be applicable e.g., with semi-persistent PUSCH, periodic PUSCH and PUCCH. It is reminded that in these cases, TPMI may be updated DCI Type C As far as the Hybrid Automatic Repeat Request (HARQ) signaling, the operation requires certain rules in the case of long-term precoding. In the case when TPMI changes, it is possible that the change is made effective only for the coming HARQ processes (pending HARQ re-transmissions utilize old TMPI). Another choice is to change the TMPI at the sub-frame border, not taking into account HARQ processes aspect. One special case is when long term precoding is applied to spatial multiplexing. In that case, DCI Type A1 contains multiple MCS fields. When UE receives DCI Type A1, it calculates from the MCS fields the MCS offsets relative to (e.g.) the MCS of $1^{st}$ codeword and stores the codeword-specific MCS offsets. When UE receives DCI Type A2 containing single MCS field, UE calculates the codeword specific MCS values by applying to the received MCS field the codeword-specific offsets according to the last received DCI Type A1.

Another special case of long-term precoding is antenna selection. In many cases TX antenna unbalance due to grip of the hand and change of antenna orientation changes very slowly. As mentioned, at least the 2Tx-precoding codebook contains states (precoding vectors) for antenna selection. Therefore, antenna selection based on proposed long-term precoding is a feasible solution for the case of practical TX antenna unbalance.

The invention is applicable to both uplink and downlink channels (although the examples shown in FIG. 3 and FIG. 4 represent only uplink). It is noted that in the downlink application (FDD), UE is in charge of measuring the long-term TPMI (or quantized channel) and signaling it to the eNB via uplink channel. eNode B may configure proper CSI reporting scheme to be applied with long-term precoding. This scheme may define the measurement scheme, containing e.g. selection between measurements for long-term and short-term precoding, to be used on the CSI measurement at the UE. Furthermore, it may specify proper CSI reporting period to applicable with long-term precoding.

The long-term precoding is applicable also to Time Division Duplexing (TDD) systems and Frequency Division Duplexing (FDD) systems; there are SU-MIMO related parameters (e.g., transmission rank) which need to be under eNB's control (due to possible MU-MIMO pairing). On the other hand, due to channel reciprocity in TDD, it is possible to measure the short term/long term channel characteristics at the transmitter side. This allows various implementation-specific options for long-term precoding.

The advantages of the embodiments is that it reduces the PDCCH overhead (smaller grant can be applied with pre-coding). Long term precoding makes open-loop TX diversity redundant and means a reduced SU-MIMO transmitter/receiver (UE/eNB) and system complexity. Long term precoding allows balanced PA design at the UE side w/o compromising UL coverage.

Long term precoding provides link performance improvement against OL TX diversity schemes in the case with correlated antennas and tackles the problem caused by negative antenna correlation. The advantages are available also on PUCCH and semi-persistent scheduling and it reduces resource consumption on the PUCCH.

The above described functions can be provided by means of appropriate software and data processing apparatus. Functions may be incorporated into any appropriate network element or management system and may be provided by means of one or more data processors. The data processor may be provided by means of, for example, at least one chip. Appropriate data processing may be provided in a processing unit provided in association with a communication device, for example a mobile station. The data processing may be distributed across several data processing modules.

The above described functions may be provided by separate processors or by an integrated processor. An appropriately adapted computer program code product or products may be used for implementing the embodiments, when loaded on an appropriate data processing apparatus. The program code product for providing the operation may be stored on and provided by means of an appropriate carrier medium. An appropriate computer program can be embodied on a computer readable record medium. A possibility is to download the program code product to a communication device via a data network.

It is also noted that although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method comprising:
   receiving, by a first network element, a first scheduling grant that contains a precoding scheme used for transmitting a first signal over a connection from the first network element to a second network element;
   transmitting the first signal over the connection to the second network element according to the first scheduling grant;
   receiving, by the first network element, a second scheduling grant used for transmitting a second signal over the connection from the first network element to the second network element, wherein the second scheduling grant does not contain a precoding scheme used for transmitting the second signal; and
   transmitting the second signal over the connection to the second network element according to the first scheduling grant or the precoding scheme used for transmitting the first signal.

2. The method as claimed in claim 1, wherein the precoding scheme comprises selecting a precoding arrangement or a precoding matrix or a precoding vector.

3. The method as claimed in claim 1, wherein the first scheduling grant comprises information about Transmitted Precoding Matrix Indicator or selected precoding mode.

4. The method as claimed in claim 1, wherein the second scheduling grant does not contain information about Transmitted Precoding Matrix Indicator.

5. The method as claimed in claim 1, wherein said second network element is a base station or evolved Node B, and said first network element is a user equipment.

6. The method as claimed in claim 1, wherein the second network element updates the precoding scheme and provides the updated precoding scheme to the first network element for a subsequent transmission from the first network element to the second network element.

7. The method as claimed in claim 2, wherein the precoding vector is predetermined in such a manner that the phase of a one antenna is rotated 180 degrees between slots and phase of another antenna is left unchanged, or the phase of the one antenna is left unchanged and the phase of another antenna is rotated 180 degrees between slots.

8. The method as claimed in claim 1, wherein Transmitted Precoding Matrix Indicator is updated using a DCI Type C.

9. The method as claimed in claim 1, wherein said precoding scheme or precoding pertains to the Physical Uplink Shared Channel (PUSCH) and/or the Physical Uplink Control Channel (PUCCH).

10. A computer program product comprising a non-transitory computer-readable storage medium bearing computer program code embodied therein for use with a computer, said computer program code comprising code for performing the method of claim 1.

11. A network element comprising:
    one or more processors; and
    one or more memories including computer program code, the one or more memories and the computer program code configured, with the one or more processors, to cause the system to perform the following:
    receiving, by the network element, a first scheduling grant that contains a precoding scheme used for transmitting a first signal over a connection from the network element to another network element;
    transmitting the first signal over the connection to said another network element according to the first scheduling grant;
    receiving, by the network element, a second scheduling grant used for transmitting a second signal over the connection from the network element to said another network element, wherein the second scheduling grant does not contain a precoding scheme used for transmitting the second signal; and
    transmitting the second signal over the connection to said another network element according to the first scheduling grant or the precoding scheme used for transmitting the first signal.

12. The network element as claimed in claim 11, wherein the first scheduling grant comprises a pre-coding arrangement, information of selected precoding mode, a Transmitted Precoding Matrix Indicator or other scheduling grant information.

13. The network element as claimed in claim 11, wherein the second scheduling grant does not contain information about Transmitted Precoding Matrix Indicator.

14. The network element as claimed in claim 11, wherein said another network element updates the first precoding scheme and provides the updated precoding scheme to the network element for a subsequent transmission from the network element to said another network element.

15. The network element as claimed in claim 12, wherein the precoding scheme is selected such that the average phase difference between elements of precoding vectors is maximized.

16. The network element as claimed in claim 11, wherein said another network element is a base station or an evolved Node B and said network element is a user equipment.

17. The network element as claimed in claim 11, wherein said precoding scheme pertains to the Physical Uplink Shared Channel (PUSCH) and/or the Physical Uplink Control Channel (PUCCH).

18. A method comprising:
    forwarding a first scheduling grant that contains a precoding scheme used for transmitting a first signal over a connection from a first network element to a second network element;
    receiving the first signal over the connection from the first network element according to the first scheduling grant;
    forwarding a second scheduling grant used for transmitting a second signal over the connection from the first network element to the second network element, wherein the second scheduling grant does not contain a precoding scheme used for transmitting the second signal; and receiving the second signal over the connection from the first network element according to the first scheduling grant or the precoding scheme used for transmitting the first signal.

19. The method as claimed in claim 18, wherein the precoding scheme includes a pre-coding arrangement, information of selected precoding mode, a Transmitted Precoding Matrix Indicator or other scheduling grant information.

20. The method as claimed in claim 18, wherein the second scheduling grant does not include a Transmitted Precoding Matrix Indicator.

21. The method as claimed in claim 18, wherein the precoding scheme is selected such that the average phase difference between elements of precoding vectors is maximized.

22. The method as claimed in claim 18, wherein the first scheduling grant and the second scheduling grant pertain to the Physical Uplink Shared Channel (PUSCH) and/or the Physical Uplink Control Channel (PUCCH).

23. The method as claimed in claim 18, wherein the first network element is a user equipment and the second network element is a base station or an evolved Node B.

24. A network element comprising:
one or more processors; and
one or more memories including computer program code, the one or more memories and the computer program code configured, with the one or more processors, to cause the network element to perform the following:

forwarding a first scheduling grant that contains a precoding scheme used for transmitting a first signal over a connection from another network element to the network element;

receiving the first signal over the connection from said another network element according to first scheduling grant;

forwarding a second scheduling grant used for transmitting a second signal over the connection from said another network element to the network element, wherein the second scheduling grant does not contain a precoding scheme used for transmitting the second signal; and receiving the second signal over the connection from said another network element according to the first scheduling grant or the precoding scheme used for transmitting the first signal.

25. The network element as claimed in claim 24, wherein the precoding scheme comprises a pre-coding arrangement, information of selected precoding mode, a Transmitted Precoding Matrix Indicator or other scheduling grant information.

26. The network element as claimed in claim 24, which is a base station or an evolved Node B, and wherein said another network element is a user equipment.

* * * * *

UNITED STATES PATENT AND TRADEMARK OFFICE
CERTIFICATE OF CORRECTION

PATENT NO. : 9,831,927 B2
APPLICATION NO. : 14/715911
DATED : November 28, 2017
INVENTOR(S) : Esa T. Tiirola, Kari P. Pajukoski and Kari J. Hooli It is certified that error appears in the above-identified patent and that said Letters Patent is hereby corrected as shown below:

On the Title Page

Related US Application Data:
(63) "Pat. No. 9,017,412" should be deleted and --Pat. No. 9,071,412-- should be inserted.

Signed and Sealed this
Eighth Day of May, 2018

Andrei Iancu
*Director of the United States Patent and Trademark Office*